United States Patent
Ferrara, Jr. et al.

(10) Patent No.: US 11,822,838 B1
(45) Date of Patent: Nov. 21, 2023

(54) METHOD AND SYSTEM FOR SECURELY EXCHANGING PRINT JOB INFORMATION

(71) Applicant: Xerox Corporation, Norwalk, CT (US)

(72) Inventors: Joseph M. Ferrara, Jr., Webster, NY (US); Ana R. Fietz-Bogota, Spencerport, NY (US); Sean Keyes, Fairport, NY (US); Emmett Spence, Honeoye Falls, NY (US); Joseph Frederick Casey, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/061,346

(22) Filed: Dec. 2, 2022

(51) Int. Cl.
  *G06F 3/12* (2006.01)
  *H04L 9/32* (2006.01)
  *H04N 1/44* (2006.01)

(52) U.S. Cl.
  CPC .......... *G06F 3/1238* (2013.01); *G06F 3/1267* (2013.01); *H04L 9/3213* (2013.01); *H04N 1/4486* (2013.01)

(58) Field of Classification Search
  None
  See application file for complete search history.

(56) References Cited

U.S. PATENT DOCUMENTS

| | | | |
|---|---|---|---|
| 9,137,405 B2 | 9/2015 | Eschbach et al. |
| 9,282,215 B2 | 3/2016 | Chapman et al. |
| 9,679,276 B1 | 6/2017 | Cuende |
| 9,919,477 B2 | 3/2018 | Levine et al. |
| 9,960,920 B2 | 5/2018 | Cuende et al. |
| 9,961,230 B2 | 5/2018 | Eschbach et al. |
| 10,129,032 B2 | 11/2018 | Vandervort |
| 10,164,952 B2 | 12/2018 | Vandervort |
| 10,237,442 B2 | 3/2019 | Chapman et al. |
| 10,270,600 B2 | 4/2019 | Vandervort |
| 10,425,554 B1 | 9/2019 | Chapman |
| 10,452,964 B1 | 10/2019 | Chapman et al. |

(Continued)

FOREIGN PATENT DOCUMENTS

| | | |
|---|---|---|
| WO | 2018165155 A1 | 9/2018 |
| WO | 2019/141297 | 7/2019 |

OTHER PUBLICATIONS

Holland and Stjepandic, "Intellectual Property Protection of 3D Print Supply Chain with Blockchain Technology," 2018 IEEE International Conference on Engineering, Technology and Innovation (ICE/ITMC), pp. 1-8 (2018).

(Continued)

*Primary Examiner* — Haris Sabah
(74) *Attorney, Agent, or Firm* — Fox Rothschild LLP (57) ABSTRACT

A print management service facilitates the secure exchange of print job information between a client who requests a print job and multiple candidates who may wish to bid on the job. The service generates a smart contract that includes some information about the print job but that omits other information, such as the content to be printed. When a print service provider submits a qualifying bid to a processor that executes the smart contract, the smart contract will award the job to that provider, and the print service provider will then receive access to the full content of the print job. The smart contract may require proof of work to trigger payment from the client to the service provider upon completion of the print job.

22 Claims, 3 Drawing Sheets

(56) References Cited

U.S. PATENT DOCUMENTS

| | | | |
|---|---|---|---|
| 10,462,326 B2 | 10/2019 | Chapman | |
| 10,812,675 B1 | 10/2020 | Chapman | |
| 10,926,471 B2 | 2/2021 | Levine et al. | |
| 10,960,698 B2 | 3/2021 | Beabes et al. | |
| 11,170,092 B1* | 11/2021 | Liang | H04L 9/0637 |
| 2017/0237570 A1* | 8/2017 | Vandervort | H04L 63/0442 |
| | | | 713/176 |
| 2017/0279783 A1 | 9/2017 | Milazzo et al. | |
| 2017/0329996 A1 | 11/2017 | Wilson | |
| 2020/0092106 A1* | 3/2020 | Leong | H04L 9/3268 |
| 2021/0132888 A1 | 5/2021 | Yuki et al. | |
| 2021/0208822 A1* | 7/2021 | Veenma | G06F 3/1211 |
| 2022/0294642 A1* | 9/2022 | Moriya | G06F 21/60 |

OTHER PUBLICATIONS

Disclosed Anonymously,"Concept for the secure transfer and limitation of 3D print files based on a permissioned blockchain," An IP.com Prior Art Database Technical Disclosure, IP.com No. IPCOM000251141D, Electronic Publication Date: Oct. 17, 2017 (9 pages).

Prints authenticated by James Moritz, Sep. 17, 2021.

How NFTs are Tracked and Verified, Cyber Scrilla, Feb. 14, 2022, available at https://cyberscrilla.com/how-nfts- are-tracked-and-verified/.

C. Lakmal, S. Dangalla, C. Herath, C. Wickramarathna, G. Dias and S. Fernando, "IDStack—The common protocol for document verification built on digital signatures," 2017 National Information Technology Conference (NITC), 2017, pp. 96-99, doi: 10.1109/NITC.2017.8285654.

\* cited by examiner

FIG. 3

METHOD AND SYSTEM FOR SECURELY EXCHANGING PRINT JOB INFORMATION

BACKGROUND

Businesses, schools, government agencies, individuals, and other entities who need to have one or more documents printed often seek quotes for the print job from more than one candidate print service provider. However, current methods and systems for sharing of information between potential suppliers and the client have many disadvantages.

For example, in order to generate an accurate quote, a supplier may want or need to know the client's location, along with details about the job and its contents. Ideally, the supplier will receive an image of the document to be printed. However, for security reasons the client may not be willing or able to share this information before awarding the job to the supplier. For example, the document may contain personally identifiable information about one or more people, it may contain details about a corporate transaction that is in the process of being negotiated, or it may include questions and/or answers for a test. When this happens, the service provider may provide a quote that is too high or too low, or the service provider may decline to quote at all, which leads to a loss in business for the supplier and reduced options for the client.

In addition, some service provider may engage in fraud in online marketplaces by accepting projects and payment, but not actually providing the deliverables.

Thus, new methods and systems for securely exchanging sensitive information in connection with document printing, and for avoiding fraud, are needed. This patent document describes methods and systems for addressing these and other technical challenges in print service delivery.

SUMMARY

This document describes method, system, and computer program embodiments, in which a print management service may securely exchange print job information with potential suppliers and/or a client. The print management service receives a print job for a client. The print job comprises parameters for performing a service in which one or more documents are printed. The print management service stores the print job to a memory as encrypted data. The print management service also generates a smart contract comprising programming code with a subset of the parameters. The smart contract does not identify the client, and the subset of the parameters omits at least some contents of the print job. The print management service posts the smart contract to a blockchain. In response to a print service provider being awarded the print job, the print management service provides the print service provider with access to the print job, wherein the access comprises access to at least some of the contents that were omitted from the subset of the parameters. In response to receiving the full print job, the print service provider may perform the service by printing the one or more documents.

In other embodiments, this document describes a method, a system, and a computer program product by which a print service provider may bid on and complete a print job. The print service provider accesses a smart contract on a blockchain. The smart contract comprises a subset of parameters for performing a print job, and the subset of the parameters omits at least some contents of the print job. The print service provider submits a bid for the print job to the blockchain. The print service provider receives, in response to the bid, a full set of parameters for performing the print job, in which the full set of parameters include the contents of the print job that were omitted from the subset. The print service provider executes the print job by printing the one or more documents according to the full set of parameters. The print service provider transmits a notification of completion of the print job. In response to the notification of completion, the print service provider receives a delivery location for the print job. The print service provider then sends the one or more documents to the delivery location.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another and is not intended to require a sequential order unless specifically stated.

Additional terms that are relevant to this disclosure will be defined at the end of this Detailed Description section.

Figure 1:
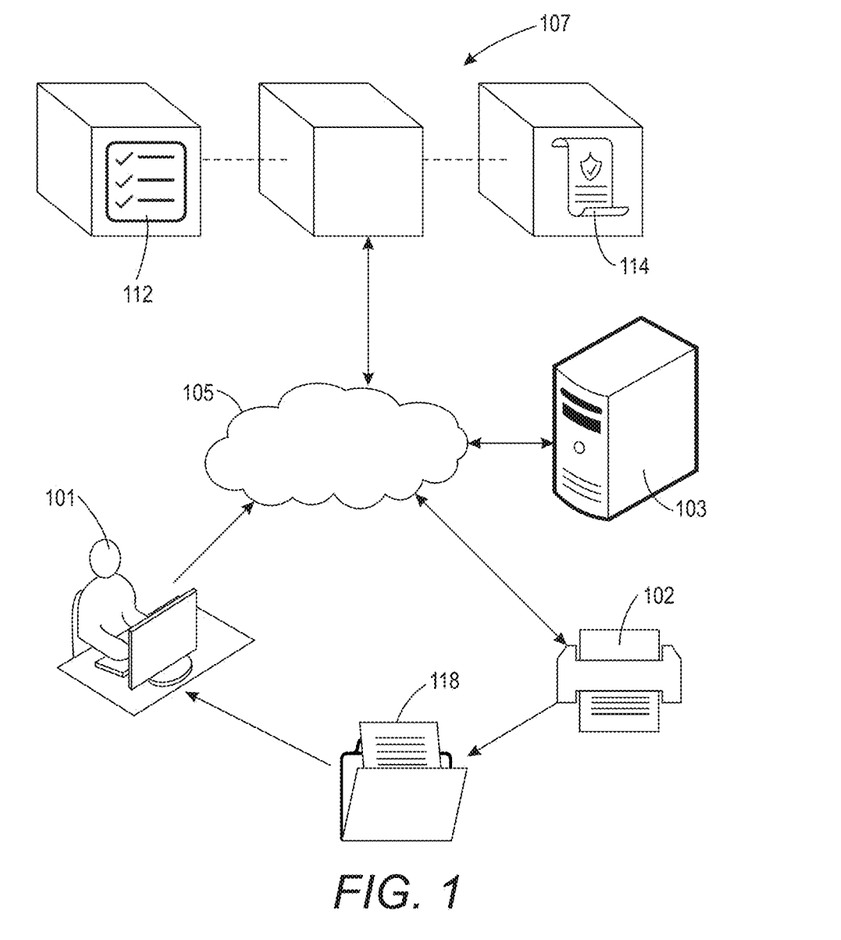
FIG. 1 illustrates an example system for securely exchanging print job information, along with entities that may participate in such a system.

FIG. 1 illustrates an example system for securely exchanging print job information, along with entities that may participate in such a system. Each entity includes one or more electronic devices and may or may not include a person or system that operates the device. At least one of the entities is a client 101, which is an entity that has a print job and seeks a print service provider to complete the job. The entities also include any number of print service providers 102, each of which operates one or more print devices that can execute at least some of the print job tasks to generate deliverables 118 that it will provide to the client 101.

The entities also include a print management service 103, which is a system of one or more computing devices that operate to coordinate the sharing of print job information between clients and candidate and selected print service providers. Any of these entities may communicate with each other via one or more communication networks 105. In addition, one or more intermediate entities may exist, such as an agent that acts on behalf of the client 101 or print service provider 102 to relay information from that entity to other entities, or to that entity from other entities.

Some of the information shared between the entities may be stored on a blockchain 107, which is a distributed digital ledger of transaction-related information. The entities may share information directly with each other and store the information on the blockchain 107, or they may store information on the blockchain so that other entities can retrieve it from the blockchain. For example, one or more of the entities may post print job information 112 to the blockchain 107 so that any candidate service provider 102 can access and retrieve the print job information 112 from the blockchain 107. The blockchain 107 also may associate the print job information with a smart contract 114 that will execute in response to receipt or identification of certain data.

Figure 2:
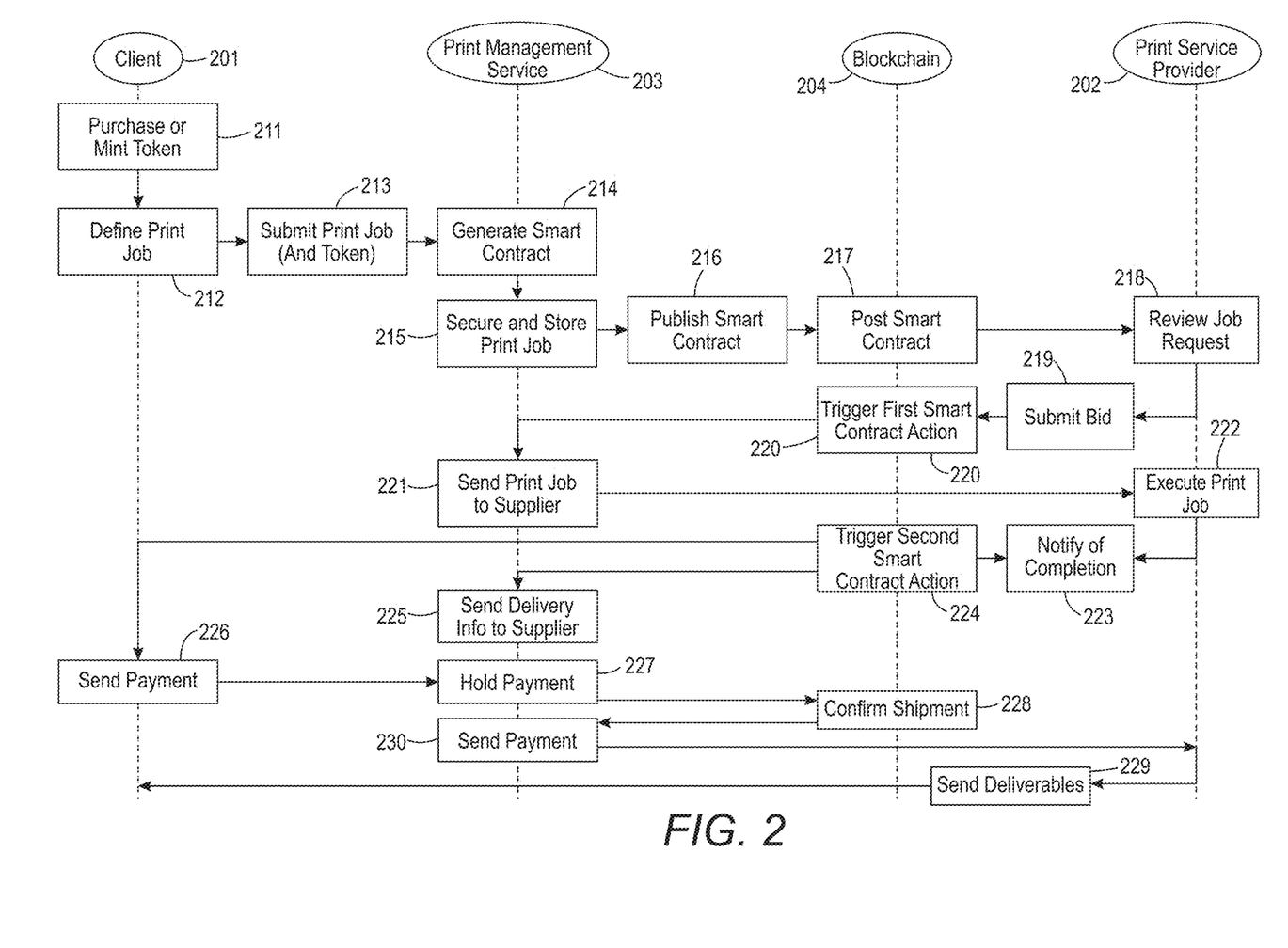
FIG. 2 is a flow diagram that illustrates a method of securely exchanging print job information.

FIG. 2 illustrates an example process by which entities such as those of FIG. 1 may securely exchange print job information. As with FIG. 1, the entities of FIG. 2 include a client 201, a print service provider 202, and a print management service 203. Some or all of the information that the entities share is processed via a blockchain 204, such as the Ethereum or bitcoin blockchain.

The process may begin at 212, when a client defines a print job that includes parameters for performing a document production service in which one or more documents are printed. The print job will include some combination of instructions, parameters, and data, such as content to be printed, a number of copies to be made, paper size and type, binding instructions, a required delivery date, and/or one or more conditions that the service provider must satisfy. Examples of such conditions include requirements that the service provider process the job in a domestic location, or that the service provider have certain certifications. At 213 the client will transmit the print job to the print management service in the form of one or more digital data or programming files. Optionally, at 213 the client also may transmit a maximum price that the client is willing to pay for the document production service.

Optionally, in some embodiments before the print management service will act on the client's print job request, the client may be required to submit a digital token when submitting the print job at 213. The digital token may be in the form of cryptocurrency or another fungible or non-fungible digital asset that the print management service will accept. Optionally, at 211 prior to submitting the print job to the print management service, the client may purchase or mint the token and store the token in a digital wallet. Then, when submitting the print job at 213, the client may authorize the token to be transferred from the client's digital wallet to that of the print management service. If the token is cryptocurrency or another fungible token, the print management service may receive and hold the token in its own digital wallet for use in a future transaction. If the token is non-fungible, the print management service may hold the token in its own digital wallet, transfer it, destroy it, or otherwise dispose of the token.

At 214 the print management service will generate a smart contract that includes programming code that includes certain parameters of the print job, along with a price threshold. At 216 the print management service will publish the smart contract to a blockchain 204, where at 217 the smart contract will be posted and available for print service providers to review and submit bids to perform the print service. When generating the smart contract, the print management service will include some, but not all, of the parameters of the print job. For example, the subset of the parameters included in the smart contract may omit some or all text, images, or other contents of the print job. In addition, the smart contract will not identify the client. However, the smart contract will include other parameters that will enable candidate suppliers to generate a bid. For example, parameters in the smart contract may include the number of copies to be printed, number of pages per copy, whether the deliverables will be in color or black-and-white, print quality and/or substrate type, conditions that the service provider must satisfy, and/or other parameters.

The smart contract will also include programming code that will:

automatically award the print job project to a print service provider that submits a bid that is within the price threshold (such as the first bidder to submit such a bid, or the lowest bid under the threshold that is received during a time period), so long as the print service provider meets any required conditions;

give the print service provider who will perform the job access to the full print job;

send delivery information to the selected print service provider; and facilitate payment from the client to the print service provider.

Each of these steps will be described in more detail below.

If the client provided a maximum price to the print management service, then the price threshold in the smart contract may be a maximum price that the client is willing to pay for the print job. If the client has not provided a maximum price, then the print management service may use the parameters of the print job to estimate a price for the print job using parameters and a known data set (such as a lookup table) or any suitable set of rules for generating price estimates.

The print management service may use any now or hereafter known method to generate the smart contract. For example, the service provider may use one or more human developers to generate the code. In addition or alternatively, the service provider and/or its developers may use one or more smart contract generation tools, such as the Remix integrated development environment which can compile and run smart contracts for the Ethereum blockchain using the Solidity programming language.

At 215 the print system will store the complete print job (including the contents that were omitted from the smart contract) in a secure form, optionally by encrypting the print job and/or storing the print job on a secure server. If the print management system encrypts the print job, in some embodiments it may store the encrypted print job on the blockchain.

At 218 any print service provider may access the blockchain to review the print job parameters that are in the smart contract. However, no print service provider will be able to see the identity of the client or any of the encrypted content at this time. Print service providers may generate and submit a bid 219 by transmitting the bid to a processor that is executing the smart contract. The bid will include a price that the print service provider will charge for the print job, optionally along with other parameters such as a delivery time and/or an indication of whether the service provider satisfies one or more conditions that the client requires.

A bid that is within the maximum price threshold and that satisfies the client's other conditions (if any) will qualify to be awarded the print job. If the system receives a single qualified bid, at 220 as a first action the smart contract may trigger an award of the print job to that bidder. If the system receives more than one qualifying bid, then in the first action at 220 the system may select the first qualifying bid, or it may select the lowest-price qualifying bid, or it may use one or more other criteria to select, from the multiple qualifying bids, the bidder to which it will award the contract.

The first smart contract action will cause the full print job, including the contents that were omitted from the smart contract, to be sent to the winning print service provider at 221. To do this, the smart contract may send the print management service notification that it has awarded the print job to the print service provider. In response, the print management service will transmit the print job, or it will transmit access credentials and an address where the print job may be accessed, to the print service provider. Alternatively, if the print job is encrypted and stored on the blockchain, the smart contract may cause the processor to send the access credentials and address to the print service provider.

After the print service provider receives the print job, at 222 it will execute the print job by causing one or more print devices to print the client's requested document according to the parameters set forth in the print job request. Upon completion, the print service provider will notify the smart contract processor that the service is completed at 223. This may require a proof of work, such as an encrypted or otherwise secure scan or photo of the printed documents.

Upon receipt of the notice of completion and (if required) proof of work, at 224 the smart contract will trigger one or more other actions. For example, if a delivery address or other delivery instructions were omitted from the smart contract, the print management service may (at 225) send delivery information to the print management supplier, such as a delivery address or the identity of a shipping service that will pick up the printed documents. The smart contract also may also trigger a payment from the buyer to the print service provider at 226. Optionally, a portion of the payment may be triggered earlier in the process, such as upon award of the contract, with the remainder to be paid upon completion. Alternatively, the full payment amount may be transferred in a single transaction after completion of the print job. The service provider may then send the deliverables to the client at 229.

Optionally, to ensure that the service provider actually completes the service and the client actually receives the deliverables, the payment may not go directly to the print service provider. Instead, at 227 some or all of the payment may be held by the print management service, either by itself or via a bank or third-party escrow service, until shipment of the deliverables has been confirmed. If so, then when the processor executing the smart contract receives confirmation of shipment (at 228), which means that service provider has sent the deliverables to the client (at 229) and/or the client has received the deliverables. The shipment confirmation also may include a proof of work, such as a secure scan or photo of the printed documents, a shipment tracking number, a delivery receipt, or a notification from a third-party shipping service that it has received the deliverables.

By using smart contracts and shielding certain information from various entities, the methods described above can help ensure anonymity between client and service provider during the negotiation process. In addition, some embodiments enable anonymity through the entire process, through and including delivery and payment. Finally, by requiring proof of work, the methods can help reduce fraud in online service transactions by ensuring that a service has been completed and deliverable shipped before the service provider receives full payment.

Figure 3:
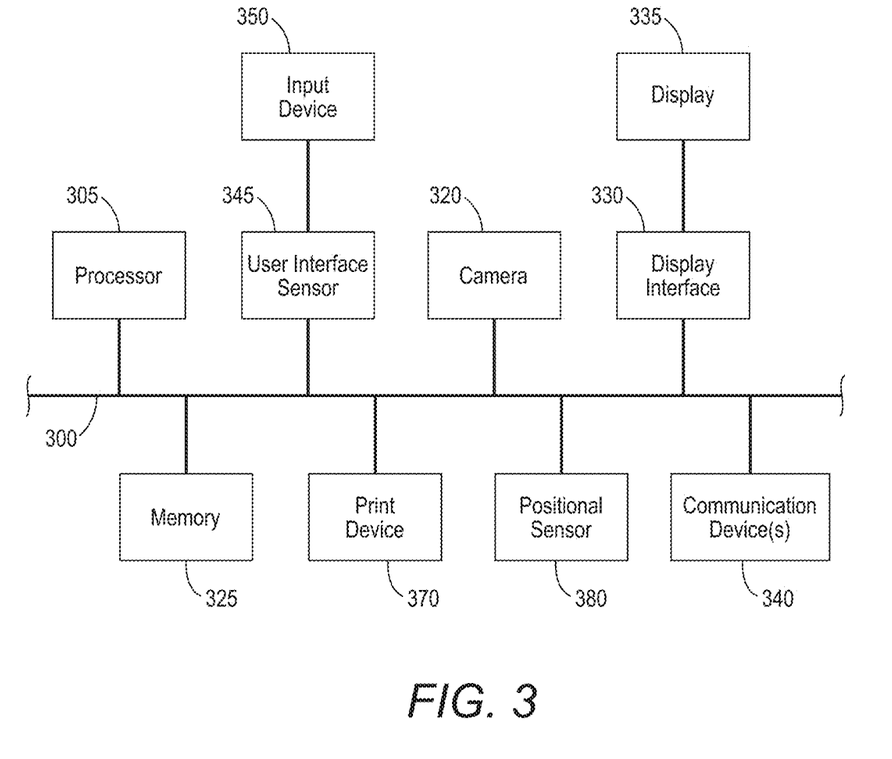
FIG. 3 illustrates example components of computing devices that may be used for by or as various entities of the system.

FIG. 3 depicts an example of internal hardware that may be included in any of the electronic components of the system, such as the user's smartphone or a local or remote computing device in the system. An electrical bus 300 serves as a communication path via which messages, instructions, data, or other information may be shared among the other illustrated components of the hardware. Processor 305 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 325. A memory device may include a single device or a collection of devices across which data and/or instructions are stored.

An optional display interface 330 may permit information to be displayed on a display device 335 in visual, graphic, or alphanumeric format. An audio interface and audio output (such as a speaker) also may be provided. Communication with external devices may occur using various communication devices 340 such as a wireless antenna, a radio frequency identification (RFID) tag and/or short-range or near-field communication transceiver, each of which may optionally communicatively connect with other components of the device via one or more communication systems. The communication device 340 may be configured to be communicatively connected to a communications network, such as the Internet, a local area network or a cellular telephone data network.

The hardware may also include a user interface sensor 345 that allows for receipt of data from input devices 350 such as a keyboard, a mouse, a joystick, a touchscreen, a touch pad, a remote control, a pointing device and/or microphone. Digital image frames also may be received from a camera 320 that can capture video and/or still images. The system also may include a positional sensor 380 to detect position and movement of the device. Examples of positional sensors 380 include a global positioning system (GPS) sensor device that receives positional data from an external GPS network.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, various embodiments can operate with software, hardware, and/or operating system implementations other than those described in this document.

Terminology that is relevant to this disclosure includes:

A "print job" refers to a job processed by one or more print devices. A print job may be embodied in a set of programming instructions and/or data that a print device or devices may use to guide their operation and thus cause a document to be printed, scanned, copied or otherwise processed. For example, a print job may include a series of processing steps for producing credit card statements for a certain credit card company, examinations to be proctored in a school or in a professional certification environment, one or more publications, or the like. In this document, a print job may refer to the set of instructions that cause the items to be produced or printed, as well as the work-in-progress and produced items themselves.

A "print service provider" refers to an entity that operates multiple document production resources, such as printers, cutters, collators, and the like.

A "printer" or "print device" is an electronic device that is capable of receiving commands and printing text, other characters, and/or images on a substrate. Print devices may include, but are not limited to, network printers, production printers, copiers and other devices using ink or toner, and multifunction devices that perform a combination of functions such as printing and scanning A "smart contract" is a set of computer program code, stored on a blockchain, that causes one or more processors to perform one or more defined tasks in response to certain conditions being met. In this way, a smart contract is a self-executing agreement. A smart contract is stored on a blockchain when an entity submits compiled code and a receiver address to the blockchain. The smart contract will start in an initial state. Once a smart contract is deployed to a blockchain, its code cannot be updated, but the state of a smart contract may change as it executes. For example, a smart contract may start by defining a set of conditions that must be met in order for a first entity to provide a service. In this example, when a processor executing the smart contract receives confirmation that a second entity has met those conditions, it may generate a command to the first entity to provide the service, and it may change to a state in which it will not monitor conditions of other potential service providers. In this example, when the processor executing the smart contract receives confirmation that the first entity has completed the service, it may trigger a payment operation from the second entity to the first entity, and it may thereafter exist in a completed state.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 3.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 204 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

Thus, in various embodiments, this document is directed to a method by which a print management service may securely exchange print job information, as well as a system and a computer program product for implementing the same. The system may include a processor and a computer-readable medium containing programming instructions that are configured to cause the processor to implement the method. The computer program product includes the computer-readable medium and the programming instructions described above.

The method includes, by the print management service, receiving a print job for a client. The print job comprises parameters for performing a service in which one or more documents are printed. The print management service stores the print job to a memory as encrypted data. The print management service also generates a smart contract comprising programming code with a subset of the parameters. The smart contract does not identify the client, and the subset of the parameters omits at least some contents of the print job. The print management service posts the smart contract to a blockchain. In response to a print service provider being awarded the print job, the print management service provides the print service provider with access to the print job, wherein the access comprises access to at least some of the contents that were omitted from the subset of the parameters.

In response to receiving the full print job, the print service provider may perform the service by printing the one or more documents.

Optionally, when receiving the print job for the client, the print management service also may receive a digital token from the client. If so, then in connection with posting the smart contract to the blockchain, the print management service may not return the digital token to the client.

Optionally, in any of the embodiments above, providing the print service provider with access to the print job also may be in response to receiving, from a processor executing the smart contract, a notification that the print service provider has been awarded the print job.

Optionally, in any of the embodiments above, providing the print service provider with access to the print job may be performed by the smart contract when self-executing.

Optionally, in any of the embodiments above, in response to receiving a notification that the print service provider completed the service, the print management service may send a delivery location for the client to the print service provider. The print management service may receive the notification that the print service provider has completed the service from a processor executing the smart contract. In response to receiving a shipment confirmation indicating that the print service provider has shipped the one or more documents to the delivery location, the print management service may cause payment for the service to be sent to the print service provider. Optionally, after receiving the notification that the print service provider completed the service and before receiving the shipment confirmation, the print management service may receive the payment and hold the payment until the shipment confirmation is received. Optionally, the print management service may receive the notification that the print service provider has completed the service from a processor executing the smart contract.

Optionally, in any of the embodiments above, the system may receive, with the print job request, a maximum amount that the client is willing to pay for completion of the print job. If so, then when generating the smart contract, the print management service may include the maximum amount as a price threshold within which the supplier must bid in order for the smart contract to award the print job to the supplier.

Optionally, in any of the embodiments above, the print management service also may analyze the print job and, based on the analyzing, estimate a cost for the print job. If so, then when generating the smart contract, the print management service may use the estimated cost to generate a price threshold within which the supplier must bid in order for the smart contract to award the print job to the supplier.

In other embodiments, a print service provider may perform a method, a system may enable a print service provider to perform the method, and/or a computer program product may include a memory with programming instructions to perform the method, in each case in which the print service provider accesses a smart contract on a blockchain. The smart contract comprises a subset of parameters for performing a print job, and the subset of the parameters omits at least some contents of the print job. The print service provider submits a bid for the print job to the blockchain. The print service provider receives, in response to the bid, a full set of parameters for performing the print job, in which the full set of parameters include the contents of the print job that were omitted from the subset. The print service provider executes the print job by printing the one or more documents according to the full set of parameters. The print service provider transmits a notification of completion of the print job. In response to the notification of completion, the print service provider receives a delivery location for the print job. The print service provider then sends the one or more documents to the delivery location.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of securely exchanging print job information, the method comprising, by a print management service:
   receiving a print job for a client, wherein the print job comprises parameters for performing a service in which one or more documents are printed;
   storing the print job to a memory as encrypted data;
   generating a smart contract comprising programming code with a subset of the parameters, wherein:
      the smart contract does not identify the client, and
      the subset of the parameters omits at least some contents of the print job, posting the smart contract to a blockchain; and
   in response to a print service provider being awarded the print job, providing the print service provider with access to the print job, wherein the access comprises access to at least some of the contents that were omitted from the subset of the parameters.

2. The method of claim 1 further comprising, by the print service provider in response to receiving the full print job, performing the service by printing the one or more documents.

3. The method of claim 1 further comprising, by the print management service:
   when receiving the print job for the client, also receiving a digital token from the client; and
   in connection with posting the smart contract to the blockchain, not returning the digital token to the client.

4. The method of claim 1, wherein providing the print service provider with access to the print job is also in response to receiving, from a processor executing the smart contract, a notification that the print service provider has been awarded the print job.

5. The method of claim 1, wherein providing the print service provider with access to the print job is performed by the smart contract when self-executing.

6. The method of claim 1 further comprising, by the print management service in response to receiving a notification that the print service provider completed the service:
  sending a delivery location for the client to the print service provider.

7. The method of claim 6, wherein the print management service receives the notification that the print service provider has completed the service from a processor executing the smart contract.

8. The method of claim 6 further comprising, by the print management service in response to receiving a shipment confirmation indicating that the print service provider has shipped the one or more documents to the delivery location:
  causing payment for the service to be sent to the print service provider.

9. The method of claim 8 further comprising, by the print management service in response to receiving the notification that the print service provider completed the service and before receiving the shipment confirmation:
  receiving the payment and holding the payment until the shipment confirmation is received.

10. The method of claim 6, wherein the print management service receives the notification that the print service provider has completed the service from a processor executing the smart contract.

11. The method of claim 1, further comprising:
  receiving, with the print job request, a maximum amount that the client is willing to pay for completion of the print job; and
  when generating the smart contract, including the maximum amount as a price threshold within which the supplier must bid in order for the smart contract to award the print job to the supplier.

12. The method of claim 1 further comprising, by the print management service:
  analyzing the print job and, based on the analyzing, estimating a cost for the print job; and
  when generating the smart contract, using the estimated cost to generate a price threshold within which the supplier must bid in order for the smart contract to award the print job to the supplier.

13. A print management service, comprising:
  a processor;
  a data store; and
  a memory containing programming instructions that are configured to cause the processor to exchange print job information by, in response to receiving a print job that comprises parameters for performing a service for a client in which one or more documents are printed:
    storing the print job to a memory as encrypted data,
    generating a smart contract comprising programming code with a subset of the parameters, wherein:
      the smart contract does not identify the client; and
      the subset of the parameters omits at least some contents of the print job,
    posting the smart contract to a blockchain, and
    in response to a print service provider being awarded the print job, providing the print service provider with access to the print job, wherein the access comprises access to the contents that were omitted in the subset of the parameters.

14. The print management service of claim 13, further comprising instructions to, when a digital token is received with the print job, not returning the digital token to the client.

15. The print management service of claim 13, wherein the instructions to provide the print service provider with access to the print job is also in response to receiving, from a processor executing the smart contract, a notification that the print service provider has been awarded the print job.

16. The print management service of claim 13, wherein generating the smart contract comprises including, within the smart contract for performance when self-executing, the instructions to provide the print service provider with access to the print job.

17. The print management service of claim 13 further comprising instructions to, in response to receiving a notification that the print service provider completed the service:
  send a delivery location for the client to the print service provider.

18. The print management service of claim 17 further comprising instructions to, in response to receiving a shipment confirmation indicating that the print service provider has shipped the one or more documents to the delivery location:
  cause payment for the service to be sent to the print service provider.

19. The print management service of claim 18 further comprising instructions to, in response to receiving the notification that the print service provider completed the service and before receiving the shipment confirmation:
  upon receiving the payment, holding the payment until the shipment confirmation is received.

20. The print management service of claim 13, wherein the instructions to generate the smart contract comprise instructions to, in response to receiving a maximum amount that the client is willing to pay for completion of the print job, include in the smart contract the maximum amount as a price threshold within which the supplier must bid in order for the smart contract to award the print job to the supplier.

21. The print management service of claim 13, further comprising instructions to:
  analyze the print job and, based on the analyzing, estimate a cost for the print job; and
  when generating the smart contract, use the estimated cost to generate a price threshold within which the supplier must bid in order for the smart contract to award the print job to the supplier.

22. A method of securely exchanging print job information, the method comprising, by a print service provider:
  accessing a smart contract on a blockchain, wherein:
    the smart contract comprises a subset of parameters for performing a print job, and
    the subset of the parameters omits at least some contents of the print job;
  submitting a bid for the print job, to the blockchain;
  in response to the bid, receiving a full set of parameters for performing the print job, wherein the full set of parameters include the contents of the print job that were omitted from the subset;
  executing the print job by printing the one or more documents according to the full set of parameters;
  transmitting a notification of completion of the print job;
  receiving, in response to the notification of completion, a delivery location for the print job; and
  sending the one or more documents to the delivery location.

* * * * *